(12) United States Patent
Ng et al.

(10) Patent No.: US 7,945,960 B2
(45) Date of Patent: May 17, 2011

(54) DYNAMIC CONDITIONAL SECURITY POLICY EXTENSIONS

(75) Inventors: Raymond K. Ng, San Jose, CA (US); Ganesh Kirti, Santa Clara, CA (US); Thomas Keefe, Mill Valley, CA (US); Naresh Kumar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1316 days.

(21) Appl. No.: 11/296,086

(22) Filed: Dec. 6, 2005

(65) Prior Publication Data

US 2007/0136819 A1    Jun. 14, 2007

(51) Int. Cl.
*H04L 9/32* (2006.01)
(52) U.S. Cl. ........................................ 726/27
(58) Field of Classification Search ....... 726/27
See application file for complete search history.

(56) References Cited

U.S. PATENT DOCUMENTS

| | | | |
|---|---|---|---|
| 6,285,989 B1 | 9/2001 | Shoham | |
| 6,961,728 B2 | 11/2005 | Wynblatt et al. | |
| 7,155,720 B2 | 12/2006 | Casati et al. | |
| 7,240,015 B1* | 7/2007 | Karmouch et al. | 705/4 |
| 7,437,718 B2 | 10/2008 | Fournet et al. | |
| 2001/0023421 A1* | 9/2001 | Numao et al. | 707/9 |
| 2002/0188869 A1* | 12/2002 | Patrick | 713/201 |
| 2003/0149714 A1 | 8/2003 | Casati et al. | |
| 2004/0190721 A1* | 9/2004 | Barrett et al. | 380/277 |
| 2005/0097353 A1* | 5/2005 | Patrick et al. | 713/200 |
| 2005/0187809 A1 | 8/2005 | Falkenhainer | |
| 2006/0015483 A1 | 1/2006 | Gownder | |
| 2006/0020813 A1 | 1/2006 | Birk et al. | |
| 2006/0026667 A1 | 2/2006 | Bhide et al. | |
| 2006/0161568 A1 | 7/2006 | Dettinger et al. | |
| 2006/0195816 A1* | 8/2006 | Grandcolas et al. | 717/101 |
| 2007/0130616 A1 | 6/2007 | Ng et al. | |

OTHER PUBLICATIONS

U.S. Appl. No. 11/296,027, filed Dec. 6, 2005, Final Office Action mailed Jul. 14, 2010, 12 pages.
U.S. Appl. No. 11/296,027, filed Dec. 6, 2005, Office Action mailed Feb. 2, 2010, 11 pages.
U.S. Appl. No. 11/296,027, filed Dec. 6, 2005, Office Action mailed Jul. 30, 2009, 11 pages.

* cited by examiner

*Primary Examiner* — Kambiz Zand
*Assistant Examiner* — Aubrey H Wyszynski
(74) *Attorney, Agent, or Firm* — Kilpatrick Townsend & Stockton LLP

(57) ABSTRACT

Systems, methods, and machine-readable media are disclosed for providing conditional grants of permission in an externally configured security policy. In one embodiment, a method is provided which comprises reading a condition clause from a grant statement defined in the security policy. The grant statement can cause the granting of permission for a user to access a requested resource. One or more constraints on the grant statement can be determined based on the condition clause. Permission can be granted to access the requested resource based on the one or more constraints.

25 Claims, 5 Drawing Sheets

DYNAMIC CONDITIONAL SECURITY POLICY EXTENSIONS

BACKGROUND OF THE INVENTION

Embodiments of the present invention relate generally to the field of system or data security and more particularly to providing dynamic and/or conditional extensions to a security policy.

Security policies for accessing computer systems or resources can be "hard-coded" into applications that control access to those systems or resources. For example, an application controlling access to a file or group of files can include code for authenticating and/or authorizing a user requesting to access the file or files. While effective, such an approach presents problems in that it is rather inflexible. That is, since the security policy is hard-coded into the application, changing the policy generally requires recoding and recompiling the source code of the application. For large systems, this can be time consuming and inefficient. Furthermore, code revisions present the possibility of new problems or bugs being introduced into the system requiring time and effort to troubleshoot. Worse yet is the possibility that such problems may go undetected creating new vulnerabilities for the system.

Attempts to address some of these problems have been made using externally defined security policies that can be changed without modifying the application code. One example of an approach that provides an externally defined security policy is the Java Authentication and Authorization Service (JAAS). As is known in the art, JAAS provides methods for controlling login, authentication, authorization and other access control functions. JAAS methods can use external configuration files, databases, directories, etc. in which a security policy can be defined. Applications using JAAS to control access to resources can pass the path of the configuration file defining the security to the JAAS runtime during startup. In this way, the applications do not need to include code defining the security policy. Rather, the policy is defined externally in the configuration file and can be changed by modifying the configuration file without modifying the code of the application.

However, such an approach still has drawbacks. Primarily, the external configuration files that define the security policy and the JAAS methods that use the configuration files to control access to resources do not allow for conditional definition of permissions in the security policy. That is, the statements in the configuration file grant particular users or groups of users permission to access particular resources or groups of resources. However, these statements do not allow for granting of such permission only if a specified condition is met. For example, a security policy may be desired in which managers are allowed to modify records of only those employees who report to that manager, i.e., permission is granted to the manager to modify a record only if the employee represented by that record reports to that manager. Such a dynamic security policy, which can and often does change at runtime during policy evaluation, would be difficult to capture in the statically-configured JAAS policy. To do so, the configuration file would need to list specifically those files or groups of files to which the manager could be granted access. Such a definition would require significant administrative overhead to manage and maintain as work assignments and employees change.

Hence, there is a need in the art for externally defined security policies that allow for conditional and/or dynamic definitions in the policy.

BRIEF SUMMARY OF THE INVENTION

Systems, methods, and machine-readable media are disclosed for providing conditional grants of permission in an externally defined security policy. In one embodiment, a method is provided which comprises reading a condition clause from a grant statement defined in the security policy. The grant statement can cause the granting of permission for a user to access a requested resource. In some cases, the grant statement can comprise a Java Authentication and Authorization Service (JAAS) grant statement. One or more constraints on the grant statement can be determined based on the condition clause. Permission can be granted to access the requested resource based on the one or more constraints. According to one embodiment, determining one or more constraints based on the grant statement can comprise evaluating the condition clause as a Boolean expression. In such a case, granting permission based on the one or more constraints can comprise granting permission where the Boolean expression evaluates as TRUE.

According to another embodiment, the method can further comprise reading information from the resource identified by the grant statement and/or determining a current context. In such a case, granting permission to access the resource based on the one or more constraints can comprise granting permission to access the resource if the information from the resource identified by the grant statement and the current context match. According to yet another embodiment, the current context can be defined by an attribute of a subject, an attribute of an object, and/or an attribute of an environmental variable.

According to still another embodiment, a system can comprise a processor and a memory coupled with and readable by the processor. The memory can contain instructions for providing conditional grants of permission based on an externally defined security policy, wherein the instructions. When executed by the processor, the instructions can cause the processor to read a condition clause from a grant statement defined in the security policy. The grant statement can cause the granting of permission for a user to access a requested resource. In some cases, the grant statement can comprise a Java Authentication and Authorization Service (JAAS) grant statement. One or more constraints on the grant statement can be determined based on the condition clause. Permission can be granted to access the requested resource based on the one or more constraints. According to one embodiment, determining one or more constraints based on the grant statement can comprise evaluating the condition clause as a Boolean expression. In such a case, granting permission based on the one or more constraints can comprise granting permission where the Boolean expression evaluates as TRUE.

According to yet another embodiment, a machine-readable medium can have stored thereon a series of instructions. The instructions, when executed by a processor, can cause the processor to provide conditional grants of permission based on an externally defined security policy by reading a condition clause from a grant statement defined in the security policy. The grant statement can cause the granting of permission for a user to access a requested resource. In some cases, the grant statement can comprise a Java Authentication and Authorization Service (JAAS) grant statement. One or more constraints on the grant statement can be determined based on the condition clause. Permission can be granted to access the requested resource based on the one or more constraints. According to one embodiment, determining one or more constraints based on the grant statement can comprise evaluating the condition clause as a Boolean expression. In such a case, granting permission based on the one or more constraints can comprise granting permission where the Boolean expression evaluates as TRUE.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for providing conditional and/or dynamic grants of permission in an externally defined security policy such as a security policy defined in a Java Authentication and Authorization Service (JAAS) security policy. That is, embodiments of the present invention provide for conditional grants of permission in a security policy that is defined outside of, such as in a configuration file separate from, the code that enforces the policy. As will be described in detail below, providing conditional grants of permission in an externally defined security policy can comprise, according to one embodiment of the present invention, reading a condition clause from a grant statement defined in the security policy. The grant statement can cause the granting of permission for a user to access a requested resource. One or more constraints on the grant statement can be determined based on the condition clause. Permission can be granted to access the requested resource based on the one or more constraints.

Importantly, while embodiments of the present invention are discussed herein with reference to JAAS, it should be understood that these embodiments are not limited to use with JAAS. Rather, it should be understood that other types of access control systems can be used with the various embodiments discussed herein. Embodiments of the present invention are thought to be equally useful with other systems using an externally defined security policy.

Figure 1:
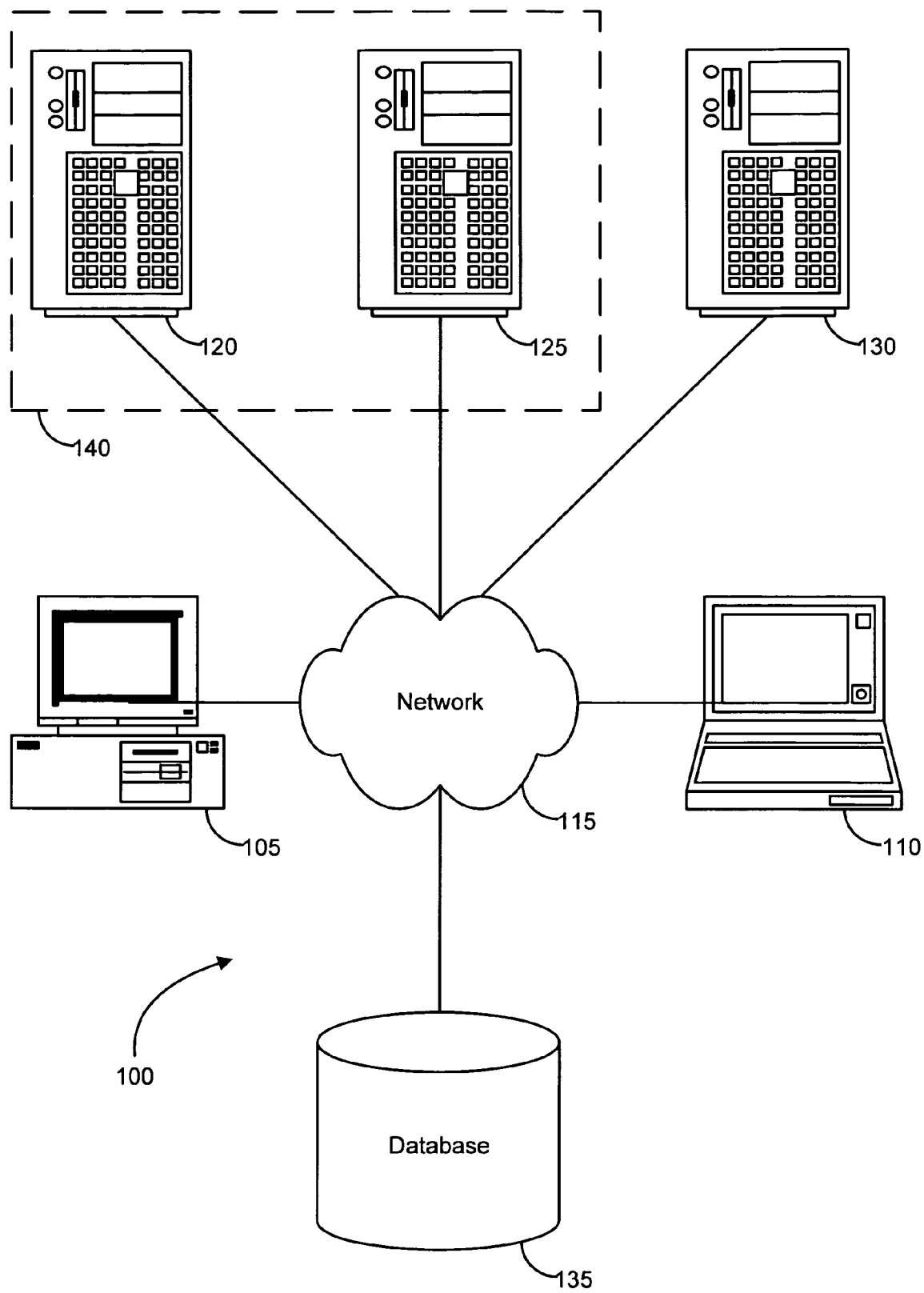
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running a mid-tier application, such as a business application, a web server, application server, etc. Such servers may be used to process requests (including client work requests) from user computers 105, 110. The mid-tier applications can also include any number of applications for controlling access to resources of the servers 120, 125, 130. Such applications may be implemented, for example, using JAAS or another system that that uses an externally defined security policy for controlling access to the resources.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

In some embodiments, a mid-tier application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to a mid-tier application and/or a database server. Those skilled in the art will recognize that the functions described with respect to various types of servers may be performed by a single server and/or a plurality of specialized servers, depending on implementation-specific needs and parameters.

In accordance with some embodiments, one or more servers (e.g., 120, 125) may be database servers and/or may be configured to operate in a clustered environment (as indicated by the broken line 140 of FIG. 1). As defined herein, a cluster of computers can include one or more computers that are configured to operate in coordinated fashion, e.g., by providing parallel processing of instructions, responding to job requests cooperatively, maintaining multiple instances of an application and/or a database, and/or the like. In particular embodiments, a cluster may be configured to provide many database services, and/or each member ("node") of a cluster may be configured to operate an RDBMS (such as Oracle 10g), which may be a cluster-aware. Optionally, each server 120, 125 can have a separate instance of a database managed by that database management program. The cluster, therefore, can provide database services on a scalable, high-availability basis familiar to those skilled in the art. Each of the servers 120, 125 may also include one or more "clusterware" programs familiar to those skilled in the art. One example of a clusterware program that may be employed in various embodiments is Oracle's Cluster Ready Services ("CRS"). In some cases, a particular server may be configured to run both an RDBMS and one or more mid-tier applications. In other cases, a service may execute on one or many instances of the cluster.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

In particular embodiments, each database server 120, 125 (and/or each cluster node) may include its own database (which is shown on FIG. 1, for ease of illustration, as a single database 135), which may be stored local to that server, on a network (including a SAN), etc. In some of these embodiments, each server's database may be an instance of a common, clustered database, an arrangement familiar to those skilled in the art. In other embodiments, each database server 120, 125 may be configured to access a common instance of the database 135.

Figure 2:
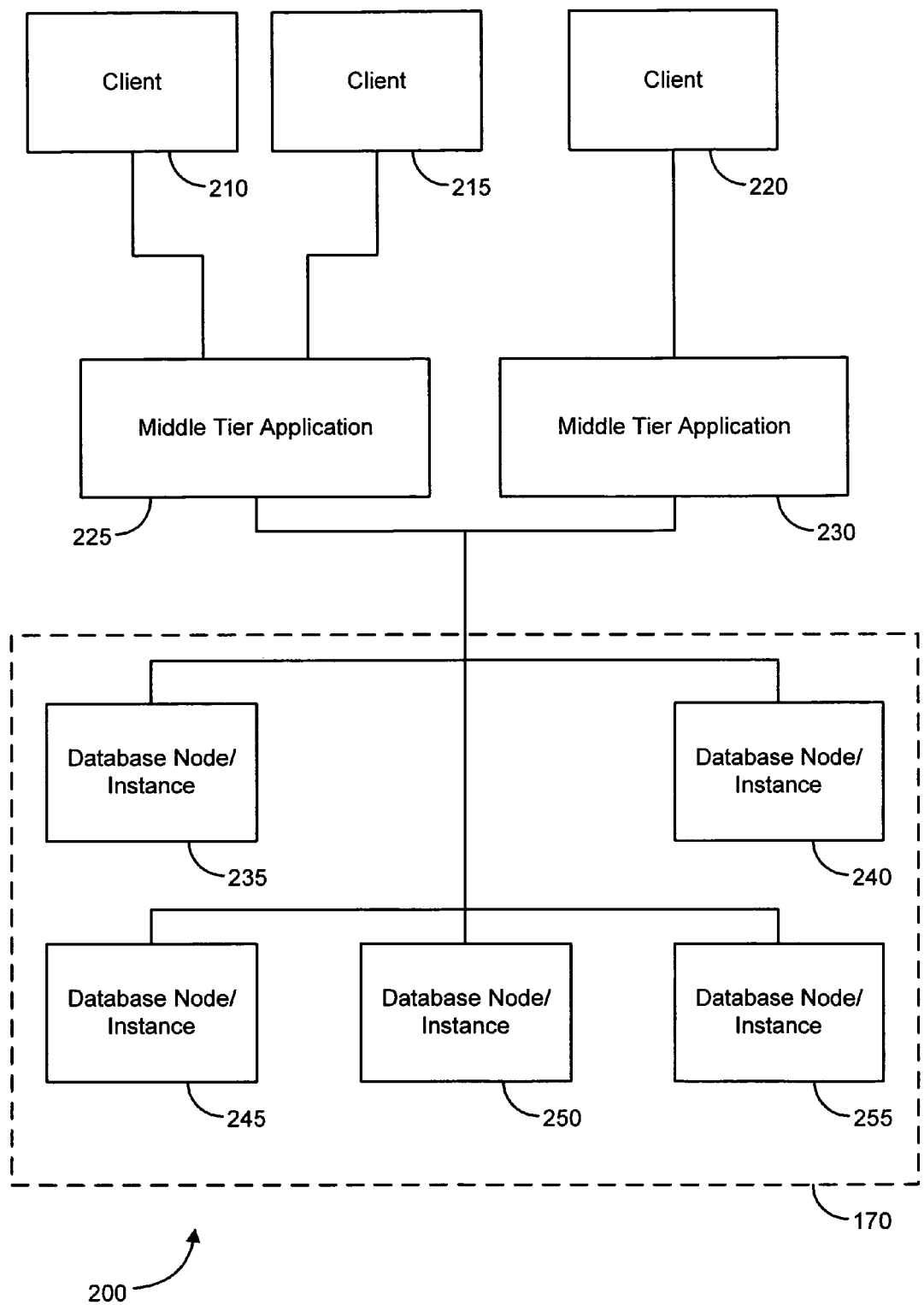
FIG. 2 is a block diagram of a multi-tiered database system in which various embodiments of the present invention may be implemented.

FIG. 2 is a block diagram of a multi-tiered system 200, in which various embodiments of the present invention may be implemented. The system 200 may include one or more clients 210-220 (such as, for example, the clients described above), which may be running on an end user computer. Each of the clients may be in communication with one or more mid-tier applications 160, which, in turn, may be in communication with a database 235-255 (in some cases, this communication may be mediated by an RDBMS). As noted above, the mid-tier application 160 can include any number of applications for controlling access to resources. Such applications may be implemented, for example, using JAAS or another system that that uses an externally defined security policy for controlling access to the resources. In various embodiments, as described above, the database 235-255 may comprise a plurality of instances (e.g., 235-255). In particular embodiments, each of the instances may be part of a cluster arrangement (denoted by the box 205). Thus, the system 200 may include a session and/or connection pooling scheme, whereby a client and/or mid-tier application simply submits a work request to a set of pooled sessions/connections, and the RDBMS allocates the work request based on node/instance availability, load balancing considerations, etc.

Figure 3:
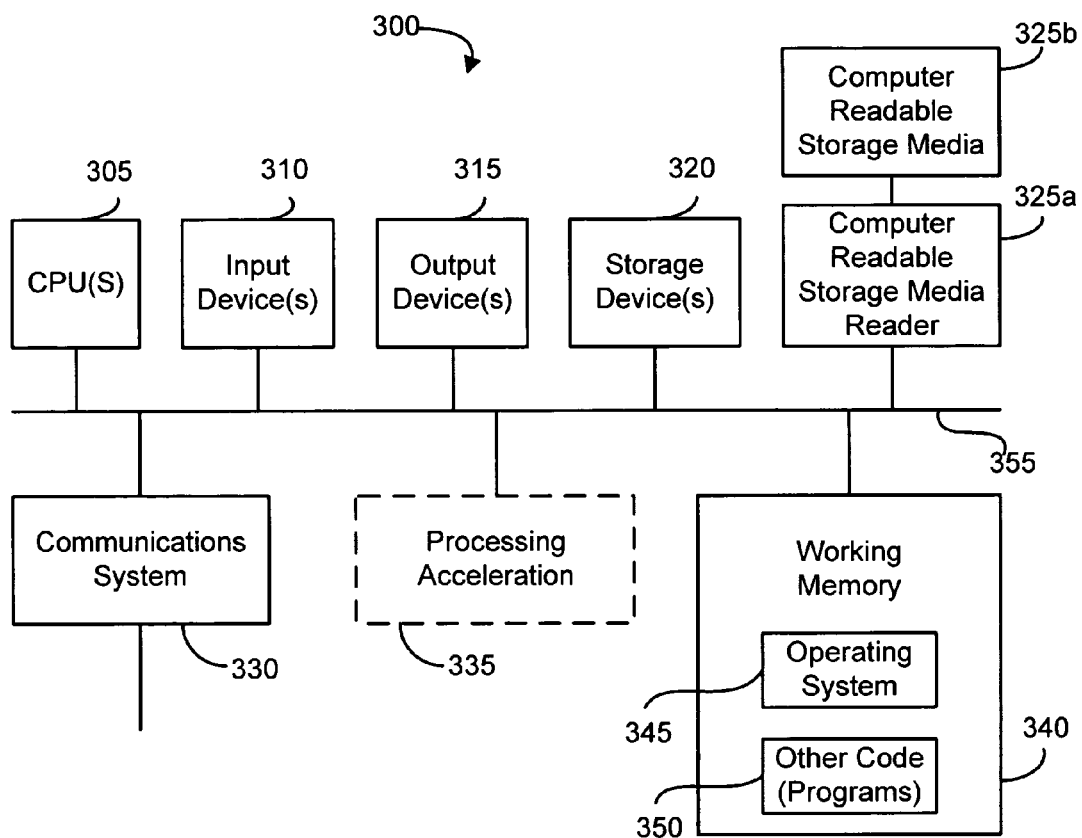
FIG. 3 is a block diagram illustrating an exemplary computer system in which embodiments of the present invention may be implemented.

FIG. 3 illustrates an exemplary computer system 300, in which various embodiments of the present invention may be implemented. The system 300 may be used to implement any of the computer systems described above such as the server computers or the user computers. The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325a, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325a can further be connected to a computer-readable storage medium 325b, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 120 and/or any other computer described above with respect to the system 100.

The computer system 300 may also comprise software elements, shown as being currently located within a working memory 340, including an operating system 345 and/or other code 350, such as an application program (which may be a client application, web browser, mid-tier application, RDBMS, etc.). The application programs may have and/or designed to implement methods of the invention.

It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed. Software of computer system 300 may include code 350 for providing conditional grants of permission in an externally defined security policy.

Generally speaking, a method of providing conditional grants of permission to access one or more resources may be implemented in one or more programs, modules, routines, methods, or other software that use an externally defined security policy. For example, a method of providing conditional grants to access one or more resources may be implemented in one or more modified JAAS methods that read a security policy from a configuration file separate from, i.e., external to, the code of the JAAS method where the policy defined in the external configuration file can include one or more conditions to be satisfied for granting permission to access a requested resource. According to one embodiment, such a method can comprise reading a condition clause from a grant statement defined in the security policy. One or more constraints on the grant statement can be determined based on the condition clause. Permission can be granted to access the requested resource based on the one or more constraints.

Figure 4:
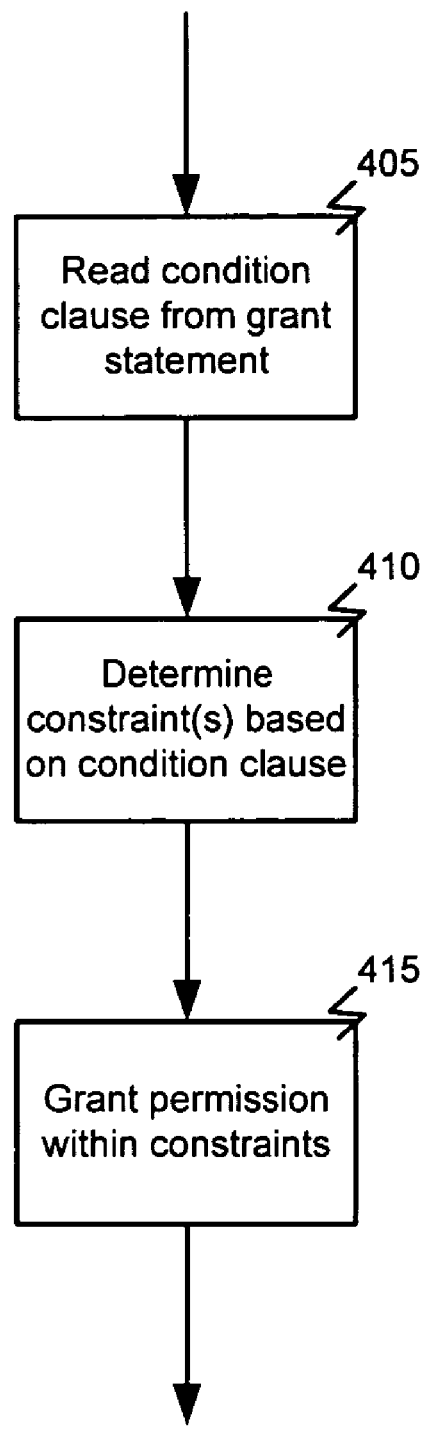
FIG. 4 is a flowchart illustrating, at a high level, a process for providing conditional grants of permission in an externally defined security policy according to one embodiment of the present invention.

FIG. 4 is a flowchart illustrating, at a high level, a process for providing conditional grants of permission in an externally defined security policy according to one embodiment of the present invention. Such a process can be initiated, for example, by a user attempting to access one or more resources such as files, database records, devices, etc. that are subject to a security policy that is defined separate from, i.e., external to, the code that controls access to the one or more resources.

In this example, the process begins by reading 505 a condition clause from a grant statement defined in the security policy. The grant statement can be used to grant permission for a user to access a requested resource. The grant statement can, for example, comprise a Java Authentication and Authorization Service (JAAS) grant statement. In such a case, the grant statement may, for example, take the form of:

grant db.DBPrinciple "scott" {permission oracle jdbc.JD-BCPermission "connect", "db904", "<<condition>>"

where "<<condition>>" is the conditional clause. So, as can be understood by those skilled in the art, such a grant statement can grant the principle "scott" permission to connect to the resource "db904". However, this grant is subject to the terms of "<<condition>>". While various types of format and/or syntax are possible and considered to be within the scope of the present invention, the condition may, according to one embodiment of the present invention, be evaluated as a Boolean expression. In such a case, granting permission based on the one or more constraints can comprise granting permission where the Boolean expression evaluates as TRUE.

Therefore, based on the condition clause, one or more constraints on the grant statement can be determined 510. For example, the condition clause introduced above may indicate "emp.bill.manager=scott". Therefore, the constraints on the grant of permission can be interpreted as granting permission to the principle "scott" for records of employee Bill if Scott is identified as the manager in the "emp.bill.manager" field of the requested record(s). If the condition is evaluated as true or otherwise determined to be satisfied, permission can be granted to access the requested resource.

Therefore, to implement such a condition, the JAAS methods or other such programs, routines, methods, etc. that use the security policy to control access should be modified to read and interpret the condition and provide access based on the condition being satisfied. That is, the security policy is extended with the addition of the condition clause and the methods or programs that use the security policy are extended to read and interpret the condition clause at runtime as described above.

Importantly, while one, limited example is discussed above, other examples and implementations can be contemplated and are considered to be within the scope of the present invention. For example, other types of Boolean, logical, or other operations can be used in the condition clause. In some cases, the condition clause can include !=, <, >, or other operators in addition to or instead of logical operators such as a logical AND, OR, NOR, etc. Also, as will be discussed, a variety of other considerations can be made part of the condition clause. For example, consideration can be given to a current context for the access request, such as the time of day, user's identity (subject's identity), server being used (machine identity), the role one or more users, etc. One example of using such contextual information will now be discussed.

Figure 5:
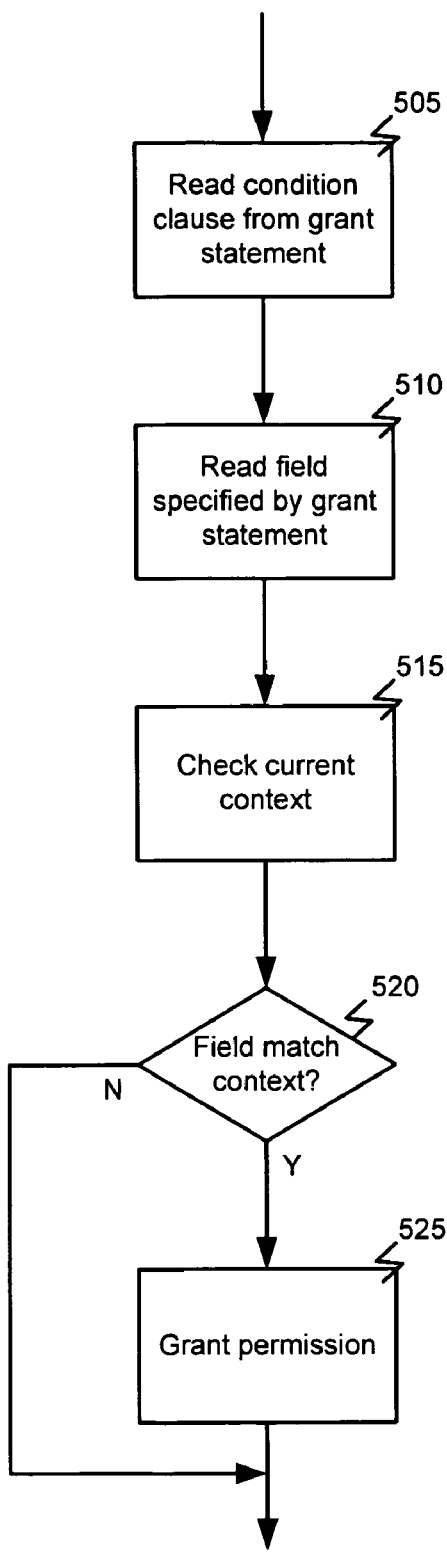
FIG. 5 is a flowchart illustrating additional details of a process for providing a dynamic conditional grant of permission to a user based on an externally defined security policy according to an alternative embodiment of the present invention.

FIG. 6 is a flowchart illustrating additional details of a process for providing a conditional grant of permission to a user based on an externally defined security policy according to an alternative embodiment of the present invention. As in the previous example discussed above with reference to FIG. 5, this process may begin in response to a user attempting to access one or more resources that are subject to a security policy. For example, this method may be initiated by an application invoking, calling, or otherwise initiating a JAAS or other method that controls access to the requested resource. The JAAS or other method then reads the security policy and perform the process described herein. This example differs from the previous approach in that it further considers a context in which the request is made so that various dynamic elements can be considered as part of the condition clause.

In this example, the process begins similar to the previous example with reading 605 a condition clause from a grant statement. The grant statement can, for example, comprise a JAAS grant statement. In such a case, the grant statement may, for example, take the form of:

grant db.DBPrinciple "scott" {
    permission oracle.jdbc.TablePermission "emp.*.salary", "update",
"emp.manager==scott"

where "emp.manager=scott" is the conditional clause. So, as can be understood by those skilled in the art, such a grant statement can grant the principle "scott" permission to update the salary field of a record. However, this grant is subject to the terms of the condition clause "emp.manager=scott", i.e., those records in which Scott is identified as the manager. Therefore, the process also includes reading 610 information from the resource identified by the grant statement, i.e., reading a field specified by the grant statement. Namely, the manager field is read.

In another example, the grant statement can be generalized further using the following form:

grant db.DBPrincipal "*" {
    permission oracle.jdbc.TablePermission "emp.*. salary",
"update", "emp.manager == ${subject.id}"
}

While this grant statement appears to be a grant to all DBPrincipals, in reality this grant dynamically restricts the scope of the permission to the specific records that belong to the direct reports of the currently logged on user ("$ {subject.id}"). This one dynamic grant is therefore able to cover the business rule "any manager can update the salary of his direct reports."

The process can further comprise determining 615 a current context. The current context can be defined, for example, by an attribute of a subject, an attribute of an object, and/or an attribute of an environmental variable. In the grant statement example above, the current context is defined by an attribute of an object, i.e., "emp.*.salary". If the * is used to represent the current user attribute of this object, the conditional statement can then be interpreted as granting permission to the principle "scott: to update the salary field of records where the current user's manager is Scott.

Therefore, the constraints on the grant of permission can be interpreted as granting permission to the principle "scott" for records where Scott is identified as the manager in the "emp.manager" field of the requested record(s) for the current user. If the condition is evaluated as true or otherwise determined to be satisfied, permission can be granted 625 to access the requested resource. That is, granting permission to access the resource based on the one or more constraints can comprise granting permission to access the resource if the information from the resource identified by the grant statement and the current context match.

Importantly, it should be understood that other types of Boolean, logical, or other types of operators can be used in the condition clause. In some cases, the condition clause can include !=, <, >, or other operators in addition to or instead of logical operators such as a logical AND, OR, NOR, etc. Additionally or alternatively, other types of contextual information may be used in the condition clause. For example, consideration can be given to a current context for the access request, such as the time of day, user's identity (subject's identity), server being used (machine identity), the role one or more users, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing conditional grants of permission based on an externally defined security policy, the method comprising:
    reading with a mid-tier application executing on a computer system a condition clause from a grant statement defined in the security policy, the grant statement granting permission for a user to access a requested resource, wherein the grant statement is defined in a security policy external to the mid-tier application, wherein the mid-tier application controls access to the resource, and wherein the grant statement comprises a Java Authentication and Authorization Service (JAAS) grant statement;
    determining with the mid-tier application executing on the computer system one or more constraints on the grant statement based on the condition clause; and
    granting with the mid-tier application executing on the computer system permission to access the requested resource based on the one or more constraints.

2. The method of claim 1, wherein determining one or more constraints based on the grant statement comprises evaluating the condition clause as a Boolean expression.

3. The method of claim 2, wherein granting permission based on the one or more constraints comprises granting permission where the Boolean expression evaluates as TRUE.

4. The method of claim 1, further comprising reading with the mid-tier application executing on the computer system information from the resource identified by the grant statement.

5. The method of claim 4, further comprising determining with the mid-tier application executing on the computer system a current context.

6. The method of claim 5, wherein granting permission to access the resource based on the one or more constraints comprises granting permission to access the resource if the information from the resource identified by the grant statement and the current context match.

7. The method of claim 5, wherein the current context is defined by an attribute of a subject.

8. The method of claim 5, wherein the current context is defined by an attribute of an object.

9. The method of claim 5, wherein the current context is defined by an attribute of an environmental variable.

10. A system comprising:
    a processor; and
    a memory coupled with and readable by the processor and contain instructions for providing conditional grants of permission based on an externally defined security policy, wherein the instructions, when executed by the processor, cause the processor to read with a mid-tier application a condition clause from a Java Authentication and Authorization Service (JAAS) grant statement defined in the security policy, the grant statement granting permission for a user to access a requested resource, wherein the grant statement is defined in a security policy external to the mid-tier application and wherein the mid-tier application controls access to the resource, determine with the mid-tier application one or more constraints on the grant statement based on the condition clause, and grant with the mid-tier application permission to access the requested resource based on the one or more constraints.

11. The system of claim 10, wherein determining one or more constraints based on the grant statement comprises evaluating the condition clause as a Boolean expression.

12. The system of claim 11, wherein granting permission based on the one or more constraints comprises granting permission where the Boolean expression evaluates as TRUE.

13. The system of claim 10, further comprising reading with the mid-tier application information from the resource identified by the grant statement.

14. The system of claim 13, further comprising determining with the mid-tier application a current context.

15. The system of claim 14, wherein granting permission to access the resource based on the one or more constraints comprises granting permission to access the resource if the information from the resource identified by the grant statement and the current context match.

16. The system of claim 14, wherein the current context is defined by an attribute of a subject.

17. The system of claim 14, wherein the current context is defined by an attribute of an object.

18. The system of claim 14, wherein the current context is defined by an attribute of an environmental variable.

19. A machine-readable memory having stored thereon a series of instructions which, when executed by a processor, cause the processor to provide conditional grants of permission based on an externally defined security policy by:

reading with a mid-tier application a condition clause from a grant statement defined in the security policy, the grant statement granting permission for a user to access a requested resource, wherein the grant statement is defined in a security policy external to the mid-tier application, wherein the mid-tier application controls access to the resource, and wherein the grant statement comprises a Java Authentication and Authorization Service (JAAS) grant statement;

determining with the mid-tier application one or more constraints on the grant statement based on the condition clause; and granting with the mid-tier application permission to access the requested resource based on the one or more constraints.

20. The machine-readable memory of claim 19, further comprising reading with the mid-tier application information from the resource identified by the grant statement.

21. The machine-readable memory of claim 20, further comprising determining with the mid-tier application a current context.

22. The machine-readable memory of claim 21, wherein granting permission to access the resource based on the one or more constraints comprises granting permission to access the resource if the information from the resource identified by the grant statement and the current context match.

23. The machine-readable memory of claim 21, wherein the current context is defined by an attribute of a subject.

24. The machine-readable memory of claim 21, wherein the current context is defined by an attribute of an object.

25. The machine-readable memory of claim 21, wherein the current context is defined by an attribute of an environmental variable.

\* \* \* \* \*

UNITED STATES PATENT AND TRADEMARK OFFICE
CERTIFICATE OF CORRECTION

| | | |
|---|---|---|
| PATENT NO. | : 7,945,960 B2 | Page 1 of 1 |
| APPLICATION NO. | : 11/296086 | |
| DATED | : May 17, 2011 | |
| INVENTOR(S) | : Ng et al. | |

It is certified that error appears in the above-identified patent and that said Letters Patent is hereby corrected as shown below:

In column 4, line 22, after "network may" delete "can".

In column 6, line 46-47, delete "335 ," and insert -- 335, --, therefor.

In column 7, line 41, delete "oracle jdbc.JD-" and insert -- oracle.jdbc.JD- --, therefor.

In column 8, line 6, delete "one," and insert -- one --, therefor.

In column 8, line 61, delete "DBPrincipal" and insert -- DBPrinciple --, therefor.

In column 8, line 66-67, delete "DBPrincipals," and insert -- DBPrinciples, --, therefor.

Signed and Sealed this
Eleventh Day of October, 2011

David J. Kappos
*Director of the United States Patent and Trademark Office*